April 4, 1944.  G. R. NEWLON  2,346,045
PIPE FABRICATING MACHINE
Filed June 18, 1941  2 Sheets-Sheet 1

Inventor
George R. Newlon,
By
Attorney

April 4, 1944.     G. R. NEWLON     2,346,045
PIPE FABRICATING MACHINE
Filed June 18, 1941     2 Sheets-Sheet 2
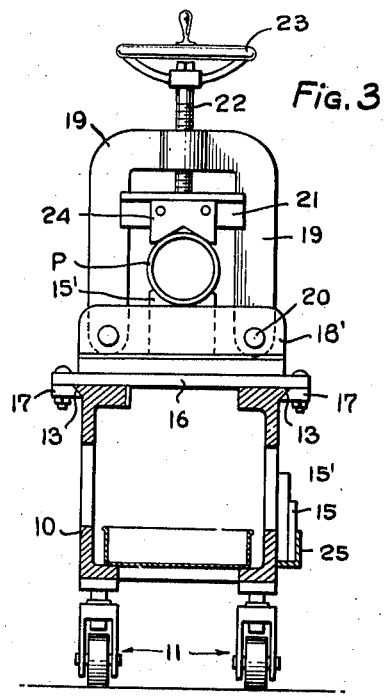
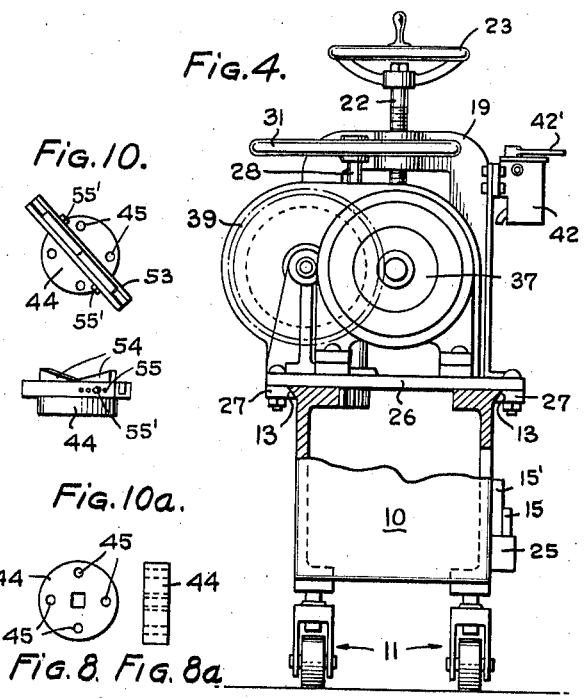
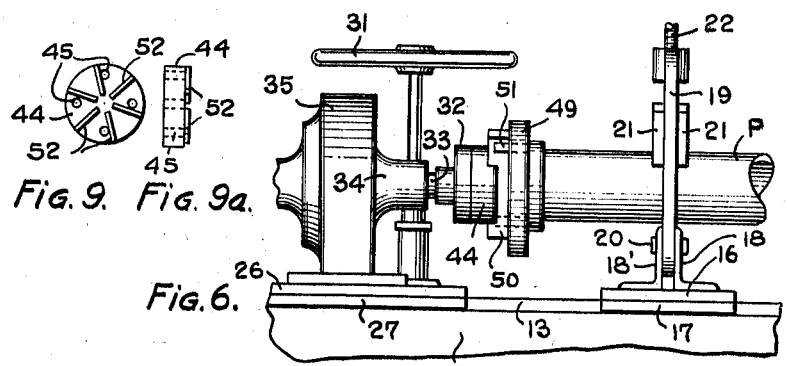
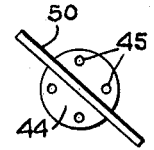
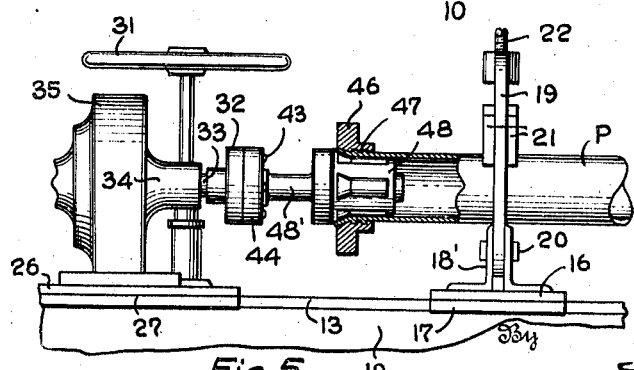
George R. Newlon,
Inventor
Attorney Patented Apr. 4, 1944

2,346,045

UNITED STATES PATENT OFFICE 2,346,045

PIPE FABRICATING MACHINE

George R. Newlon, Point Pleasant, W. Va., assignor to Marietta Manufacturing Company, Point Pleasant, W. Va., a corporation Application June 18, 1941, Serial No. 398,691

2 Claims. (Cl. 29—27)

The fabrication of pipe, whether in the field on an erection job or in the shop, calls for a multiple of different operations. For example, the flanging of pipe ends for coupling joints may require mounting of the flange, expansion of the pipe into engagement with the flange, and turning and facing of the end surface, and in certain instances a screwing-on operation. In other cases, the pipe requires threading for application of a fitting. Heretofore, as far as known, these operations were performed in the main by separate machines, and there has been a pronounced need for a unitary machine which will efficiently carry out the various pipe fabricating operations.

The present invention has for an object to provide a pipe fabricating machine capable of efficiently performing a full range of fabricating operations, including flanging, expanding, threading, turning and finishing.

Another object is to provide a power-operated pipe fabricating machine having improved features contributing to speed in production while at the same time maintaining a high standard of workmanship at a low-cost overhead.

A further object is to provide a machine which is readily adaptable for pipes of varying sizes and shapes to carry out a multiple of fabricating operations and may be used in the field where the work is being erected and serve as a substitute for a pipe shop.

The foregoing and other objects and advantages will become apparent in view of the following description taken in conjunction with the drawings, wherein:

Fig. 3 is a section taken substantially on the line 3—3, Fig. 2;

Fig. 4 is an end elevation;

Figs. 5 and 6 are fragmentary views showing the machine operating with an expanding tool and a screwing-on tool, respectively;

Figures 1, 2:
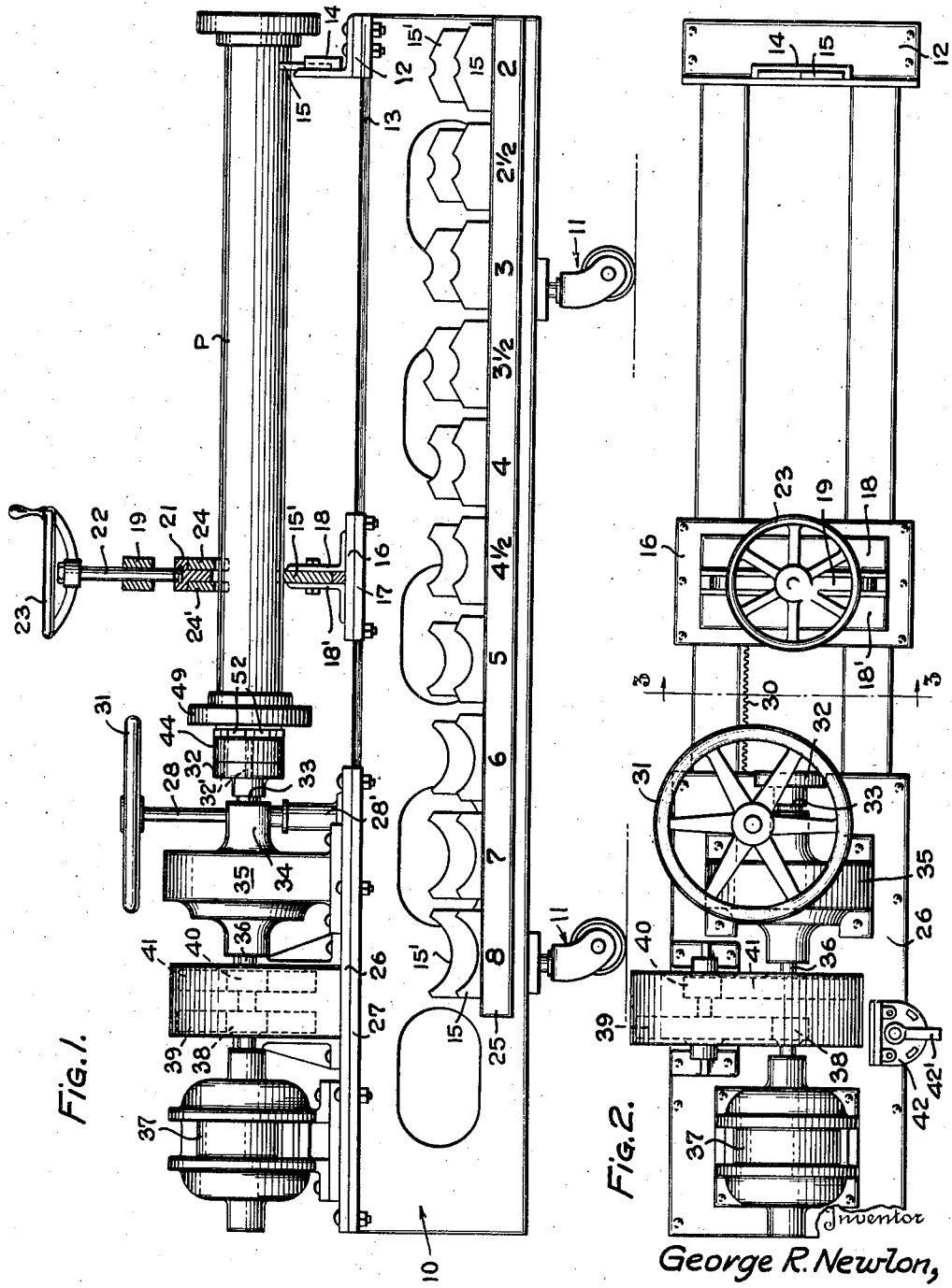
Fig. 1 is a view in section and side elevation of a pipe fabricating machine in accordance with the invention.
Fig. 2 is a plan view thereof.

Figs. 7 to 11, inclusive, are detail views of different types of pipe-fabricating tools.

Referring in detail to the drawings and particularly to Figs. 1 to 4, inclusive, the machine comprises a bed frame 10 which may be of skeleton construction, the entire frame being mounted on casters 11 to thereby render the machine portable. At the rear end of the frame is a slidable pipe supporting member or bracket 12 which is mounted on slideways 13 formed along the upper side edges of the bed frame and includes a part 14 defining a socket for receiving various sizes of pipe rests 15. The slidable support 12 may be adjusted along the bed frame at any desired point to support the rear end of the pipe P being fabricated.

The pipe is held or gripped while being operated upon (preferably at one point only along its length) by means of a clamping unit comprising a supporting base 16 provided with lower side bars 17 which are adjustably clamped to the slideways 13. Upstanding angle plates 18, 18' are mounted on the base 16 and define a socket for a pipe rest 15' and which may be of substantially the same construction as the pipe rest 15 but preferably more rugged. A yoke-shaped guide bracket 19 is provided and has the lower ends thereof anchored between the angle plates 18, 18' by means of pins or bolts 20. A crosshead 21 is mounted for vertical sliding movement in the yoke 19 and has the lower end of a hand screw 22 swiveled therein, the upper end of said screw being provided with a handwheel 23. The crosshead 21 has detachably connected to opposite sides thereof pipe gripping members 24, 24' adapted to engage the upper surface of the pipe being operated upon.

It will be seen that by turning the handwheel 23, the crosshead 21 carrying the pipe-gripping members 24 may be readily lowered and raised to firmly grip and release a pipe. The arrangement is preferably such that the pipe is gripped firmly at one point only along its length, so that either a straight or curved length of pipe may be held for operation upon by the machine. Thus, if the pipe is curved or of elbow shape, the curved portion is extended in rear of the gripping unit with the straight portion projected in advance of the gripping unit.

The pipe rests 15, 15' are preferably designated by size numbers, and provision is made to carry a full stock of these rests with the machine by means of a shelf or bracket 25 at the lower left-hand side of the bed frame 10.

The various fabricating tools are power-driven by means of a unit which in its entirety is mounted on a bed plate 26 provided with side rails 27 which engage over the slideways 13. A vertical shaft 28 has its lower extremity mounted in bearings 28' on the forward end of the bed plate 26 and carries a pinion 29 in mesh with a rack 30 secured to the bed frame 10, and whereby through rotation of the shaft 28, the bed frame may be advanced or retracted. The upper end of the shaft 28 is provided with a handwheel 31.

A tool holder or headstock 32 in the form of an annular disc-shaped member is provided and carries a series of pins 32' for effecting interchangeable driving engagement with the various fabricating tools hereinafter described. The tool holder or headstock 32 is secured on a stub shaft 33 mounted in a bearing 34. The drive on the stub shaft 33 is applied through a series of reduction gears constituting a gear reduction unit mounted in a housing 35. Projecting from the rear end of the housing 35 is a stub shaft 36 to which the drive is applied from motor 37 by means of reduction gears 38, 39, 40 and 41. The motor may be readily controlled by means of switch unit 42 provided with a switch lever 42'.

It will be seen that the entire drive unit may be shifted back and forth on the main bed frame 10 by means of the handwheel 31, while at the same time the tool holder may be rotated or driven by means of the motor 37 acting through a series of speed reduction units and whereby a range of power ample for practically any desired fabricating operation may be obtained.

To render the various fabricating tools adaptable for interchangeably mounting on the tool holder 32, each of said tools is provided with a common drive member in the form of a disc 44 (note Figs. 7 to 11, inclusive) formed with holes 45 adapted to register with the pins 32' projecting from the tool holder or drive head 32. In this manner, whenever it is desired to substitute a different tool, it is only necessary to mount the latter on the tool holder 32 with the pins 32' in registration with the holes 45 in any one of the discs 44.

Fig. 5 shows the machine expanding a pipe into engagement with a flange 46. In this instance, the inner surface of the flange collar is formed with a series of recesses 47, and the expanding tool 48 is mounted on a shaft 48' which at its inner end is connected to one of the discs 44, note also Fig. 8. The pipe to be flanged is first placed upon the rests 15 and 15' and handwheel 23 rotated to clamp the pipe firmly in position. The flange 46 may then be inserted over the end of the pipe and the handwheel 31 then rotated to move the bed plate 26 carrying the tool holder and driving mechanism therefor together with the expanding tool in position to act on the end of the pipe, the latter being held stationary while the tool is being rotated to expand the pipe in engagement with the flange.

In Fig. 6 the machine is shown as being used for screwing a flange 49 onto the threaded end of a pipe. In this instance, the tool disc 44 has secured on the face thereof a driving member in the form of a bar 50, note Fig. 7, which is adapted to engage pins 51 temporarily secured in the usual bolting-on holes formed in the flange 49.

In certain instances, it may be desired to finish and face the end of the pipe, as for example after the flange 46 in Fig. 5 has been applied by means of the expanding tool 48. Fig. 9 illustrates a facing tool, the disc 44 having secured on the working face thereof a series of blades 52 which are adapted to work on the end of the pipe which may protrude beyond the end of the flange.

In Fig. 10 a facing tool of the beveling type is illustrated. In this instance, the outer face of the disc 44 has secured thereon a grooved or channelled blade holder 53 having mounted therein blades 54, the holder 53 and blades 54 being formed with a series of registering holes 55 to receive screws or pins 55' for holding the blades in adjusted position within the holder 53. By adjusting the blades 54 outwardly or inwardly with respect to one another, or with respect to a common center, the working bevel may also be varied as desired.

Fig. 11 illustrates a die tool holder 56 for blockthreading dies, the face of the holder being provided with a squared driving connection 56'.

It will thus be seen that the machine may be used for carrying out varying operations on pipe stock, including flanging, facing and finishing, threading, etc. The machine is portable and the only extra equipment necessary is a line of tools each having the common mounting disc or member 44, and hence it may be used in the field as a substitute for a substantially complete pipe shop, or it may be used in a permanent shop for carrying out various pipe fabricating operations with a high degree of efficiency and at a relatively low cost overhead. The machine may be run by a single operator and the chances of errors are reduced to a minimum.

It will be understood that certain modifications in construction and design may be adopted without departing from the spirit or scope of the invention as defined by the appended claims.

What is claimed is:

1. A pipe fabricating machine comprising, an elongated bed frame having a slideway extending longitudinally thereof, a pipe rest slidably mounted on said slideway for supporting one extremity of a pipe, a pipe clamping member having a base adjustably secured to said slideway, a carriage also mounted to slide in said slideway, a tool-holder adapted to mount a plurality of fabricating tools, each having a similar mounting member provided with holes therein, said toolholder being in the form of a disc having drive pins projecting therefrom mounted on said carriage together with a driving motor and interposed speed reduction unit for said tool-holder, said pins being adapted to mate with said holes in the mounting members of the respective tools, and means for advancing and retracting said carriage to bring a tool into and retract it from operative engagement with a pipe held by said clamp.

2. A pipe fabricating machine comprising an elongated bed, a pipe rest slidably mounted on said bed for supporting one extremity of a pipe, a pipe clamping member having a base adjustably secured to said bed, a carriage also mounted to slide on said bed, a tool holder adapted to mount a plurality of fabricating tools, each having a similar mounting member provided with mating portions, said tool holder having drive elements projecting therefrom mounted on said carriage together with a driving motor and an interposed speed reduction unit for said tool-holder, said drive elements being adapted to mate with said mating portion in the mounting members of the respective tools, and means for advancing and retracting said carriage to bring a tool into and retract it from operative engagement with pipe held by said clamp.

GEORGE R. NEWLON.